UNITED STATES PATENT OFFICE.

WILLIAM HOSKINS, OF CHICAGO, ILLINOIS.

METHOD OF UNITING BY CEMENTATION.

1,041,287.  Specification of Letters Patent.  Patented Oct. 15, 1912.

No Drawing.  Application filed June 7, 1911. Serial No. 631,828.

*To all whom it may concern:*

Be it known that I, WILLIAM HOSKINS, a citizen of the United States, residing at Chicago, in the county of Cook and State of Illinois, have invented a new and useful Improvement in Methods of Uniting by Cementation, of which the following is a specification.

In the process of cementing together sheets or pieces of the same or different materials, as, for example, in veneering or in the production of multiple-ply wood or paper board, etc., it has hitherto been the universal practice to coat one or both of the surfaces to be joined with a cementing substance rendered preliminarily fluid, either by being molten or dissolved in liquid, after which the surfaces were held together under pressure until the cementing substance dried. In the use of most, if not all, of the cementing substances thus applied, it is necessary, or at least desirable, that the surfaces to be joined shall be primarily dry, as the presence of surplus moisture would interfere with the proper union of the cement with the surfaces. Therefore, in the manufacture of multiple-ply board of good quality from sheets of veneer, in the manner stated, it is necessary that the veneer after being cut shall be thoroughly dried.

One of my principal objects is to provide a method of cementing together sheets of veneer, for the production of multiple-ply board, which will permit the board to be made from wet veneer, as, for example, directly after it is cut from a log, and without the necessity of preliminarily drying the veneer. Furthermore according to my invention the sheets or pieces when assembled are not sticky and consequently may be readily adjusted into the desired position with relation to each other without difficulty.

In carrying out my invention I employ as the cementing material a non-vegetable substance, like rawhide or silicate of soda, which is insoluble, or very slowly soluble, in cold water, but which when subjected, in the presence of moisture, to a temperature approximating or exceeding the boiling point of water, becomes viscous and cementitious in character, and when subsequently dried operates as an effective agglutinant.

In the manufacture of multiple-ply board from veneer, for example, the cementing substance described is provided in finely-divided condition and applied in a thin layer, and unheated state, to one or each of the meeting surfaces of the veneer sheets. Preferably the sheets are wet when the cementing substance is applied, but if they have dried out for any reason so that they do not contain sufficient moisture for the cementing substance then of course the sheets may have the necessary additional moisture supplied to them in any desired way. The sheets are then placed together with the layer of undissolved particles of cementing substance between them and subjected to pressure and heat at a temperature, say 300° F., which will cause the cementing substance to become sticky and the surplus moisture to evaporate. In a very short time the veneer and agglutinant become dry and the latter operates to cement the sheets firmly together. Thus, for example, multiple-ply veneer-board may be manufactured much cheaper and quicker than by the old process.

My improved method of cementing surfaces together may be employed with benefit in other connections besides that of the manufacture of multiple-ply veneer-board, and the foregoing description is intended merely to convey a clear understanding of my invention in one useful application. No undue limitation should be understood therefrom, as it is my intention to claim all that is novel in my invention and that the claims shall be construed as broadly as the prior state of the art may warrant.

What I claim as new and desire to secure by Letters Patent is—

1. The process of assembling parts together, which consists in supplying a moist part, applying thereto a powdered cementitious substance substantially insoluble in water except in the presence of heat, applying a second part and subjecting them to pressure and heat whereby the moisture in the moist part under the influence of the heat dissolves the cementitious substance and causes absorption thereof by the parts, the cementitious substance to the extent of the moisture required to dissolve it assisting the action of the heat in drying the moist part.

2. The process of assembling parts together, which consists in supplying a moist part, applying thereto powdered rawhide, applying thereto a second part and subjecting them to pressure and heat whereby the moist part under the influence of the heat dissolves the powdered rawhide and causes absorption thereof by the parts, the powdered rawhide to the extent of the moisture required to dissolve it assisting the action of the heat in drying the moist part.

3. The process of assembling veneer, which consists in supplying a moist veneer, applying thereto a powdered cementitious substance substantially insoluble in water except for the presence of heat, applying a second layer of veneer and subjecting them to pressure and heat whereby the moisture in the wet veneer under the influence of the heat dissolves the cementitious substance and causes absorption thereof by the veneer, the cementitious substance to the extent of the moisture required to dissolve it assisting the action of the heat in drying the veneer.

4. The process of assembling veneer, which consists in supplying a moist veneer, applying thereto powdered rawhide, applying a second layer of veneer and subjecting them to pressure and heat whereby the moisture in the wet veneer under the influence of the heat dissolves the rawhide and causes absorption thereof by the veneer, the rawhide to the extent of the moisture required to dissolve it assisting the action of the heat in drying the veneer.

WILLIAM HOSKINS.

In presence of—
  J. G. ANDERSON,
  R. A. SCHAEFER.